Nov. 17, 1953  R. C. JOHNSON  2,659,609
VEHICLE TOWING DEVICE
Filed March 18, 1950
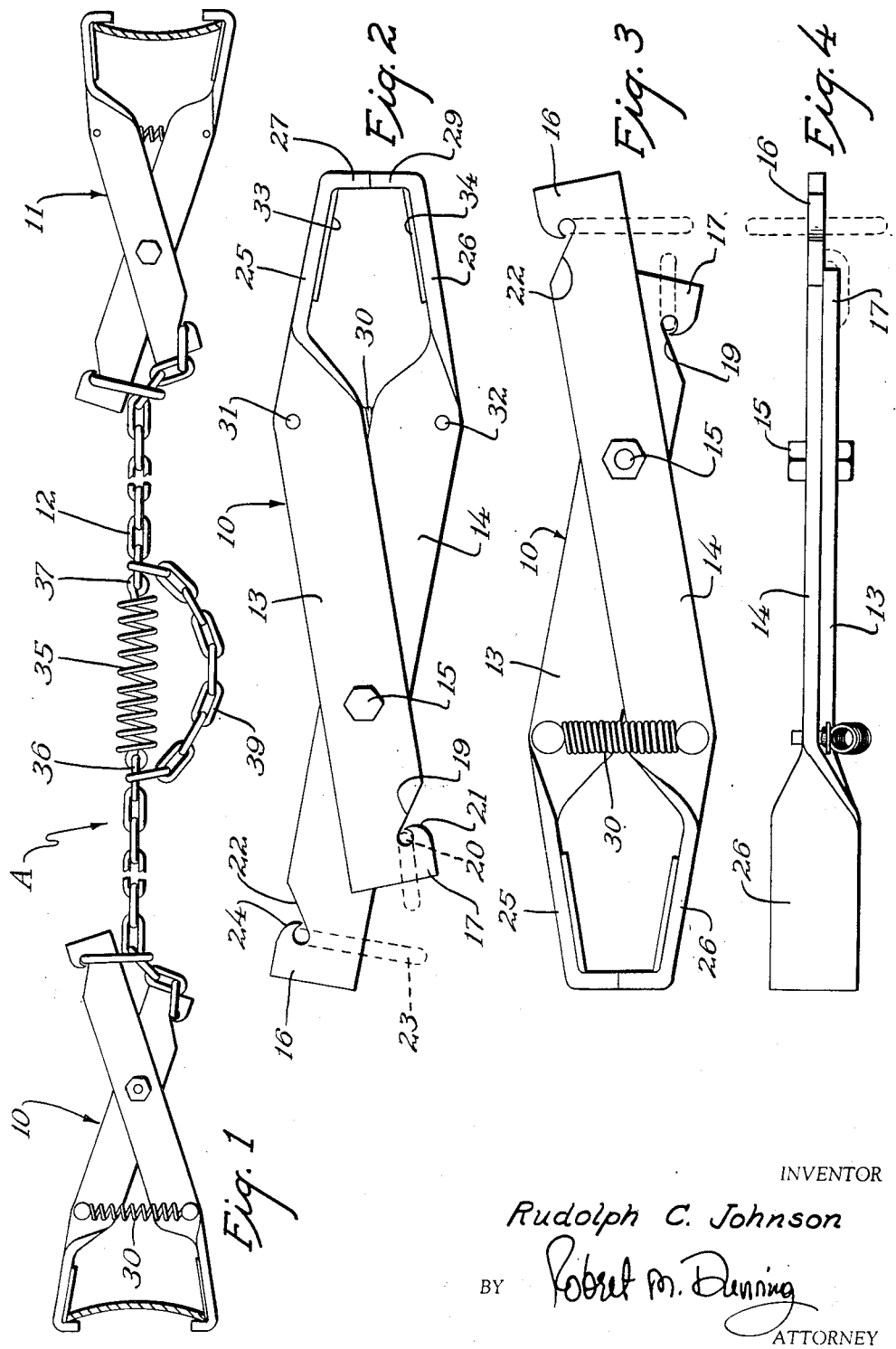
INVENTOR
Rudolph C. Johnson
BY Robert M. Dunning
ATTORNEY Patented Nov. 17, 1953

2,659,609

UNITED STATES PATENT OFFICE 2,659,609

VEHICLE TOWING DEVICE

Rudolph C. Johnson, Minneapolis, Minn.

Application March 18, 1950, Serial No. 150,366

10 Claims. (Cl. 280—33.14)

1

My invention relates to an improvement in vehicle towing device wherein it is desired to provide an apparatus for connecting two vehicles which may be quickly and easily attached thereto or detached therefrom.

Various types of cables, chains, ropes and other means have been provided for towing one vehicle behind another. One of the difficulties with such devices usually resides in the fact that they are difficult to attach to the vehicle. It has often been necessary to get under the vehicle to attach a cable or chain thereto. If such a previous towing device were attached to the vehicle bumpers, the bumpers were usually marred by the device, or the rope or cable was injured by the edge of the bumper.

An object of the present invention lies in the provision of a towing device which fastens to the vehicle bumpers without causing injury either to the bumper or to the towing device. As a result the device may be attached or detached without difficulty and in an extremely short period of time.

A further feature of the present invention lies in the provision of a towing device which attaches to the upper and lower edges of the bumper and need not encircle the same. During recent years there has been an increasing tendency to fill in the space between the bumper and the vehicle body. As a result it has often been impossible to encircle the bumper with the cable or chain. The present device engages only the upper and lower edges of the bumper and therefore may be used with virtually any type of vehicle construction.

This application is a continuation in part of my previously filed application Serial No. 87,199, filed April 13, 1949, for Vehicle Towing Device.

A further feature of the present invention lies in the provision of an attachment device somewhat similar in nature to a pair of tongs. These tongs are provided with wide flat jaws designed to engage a substantial length of the bumper and are pivotally connected together. A chain or similar connection extends between the clamping devices. This chain or other connecting means is so arranged as to create a tendency for the tongs to close as the pull on the connecting means increases. Thus there is little danger of the device slipping out of place as the pull is increased.

A feature of the present invention lies in the provision of a clamping means which includes two pivoted levers, one of which preferably extends beyond the other. The chain or other connecting means is anchored to the shorter lever and extends through a loop pivotally connected to the longer lever. Thus when a pull upon the chain is exerted, the ends of the levers tend to be drawn toward one another, thus increasing the clamping action.

An added feature of the present invention lies in the provision of a spring designed to provide initial compression upon the clamping jaws. This spring is designed to hold the clamping devices in clamping position even when the pulling force between the vehicles is decreased.

Still another object of the present invention lies in the provision of a resilient member incorporated in the chain. This resilient member connects spaced portions of the chain in such a way as to bridge a portion of the chain. As the pulling tension upon the ends of the chain is increased, this spring expands and tends to cushion the shock of the pulling force between the ends of the chain. At the same time when sufficient pulling pressure is exerted the spring will elongate and allow the minimum pulling force to be transmitted directly through the chain.

These and other objects and novel features of my invention will be more clearly and fully set forth in the following specification and claims.

In the drawings forming a part of my specification:

Figure 1 is a side elevational view of the vehicle towing device in readiness for use.

Figure 2 is an elevation view of one of the clamping means employed at the ends of the chain.

Figure 3 is an elevation view showing the opposite side of the clamping device from that illustrated in Figure 2.

Figure 4 is a top plan view of one of the clamping devices shown in Figures 2 and 3.

The vehicle towing device is indicated in general by the letter A. This device includes a pair of bumper clamps 10 and 11 connected by a chain 12, or other suitable flexible connection. As both the clamps 10 and 11 are identical in form, only one of these clamps is illustrated in detail.

The clamp 10 (or 11) includes a pair of levers 13 and 14 which are pivotally connected at 15. The lever 13 is preferably somewhat shorter than the lever 14 so that the rear end 16 of the lever 14 projects beyond the rear end 17 of the lever 13.

A hook shaped notch 19 is provided in the outer edge of the lever 13 near the rear end thereof. This notch 19 is designed to accommodate the end line 20 of the chain 12. The metal on one side of the hook shaped notch 19 is bent over the engaged portion of the link 20 as indicated at 21 so as to lock this link in the notch. The link 20 is sufficiently loose in the notch so that it may pivot, but may not escape.

The outer edge of the lever 14 is similarly provided with a hook shaped notch 22 near the rear end 16 thereof. A loop or link 23 is engaged in the notch 22. A portion of the metal adjacent the notch 22 is bent or riveted over the loop or ring 23 when it is in place as indicated at 24. In this way the loop or ring 23 is pivotally supported, but is prevented from disengaging the notch.

The levers 13 and 14 are preferably flat strips of bar stock or the like, and the forward ends of the levers are formed by bending the strips to a plane at substantially right angles to the plane of the remainder of the strips 13 and 14. The right angularly bent ends 25 and 26 are arranged to converge toward one another toward the forward ends of the levers and are bent to provide opposed ends 27 and 29 which are arranged in abutting relation when the forward ends of the jaws are pivoted together. A spring 30 is pivotally anchored at 31 to the lever 13 and is pivotally anchored at 32 to the lever 14. This spring 30 normally tends to urge the right angularly extending lever ends 25 and 26 toward one another.

In order to prevent injury to the bumper, or other member to be clamped, the ends 25 and 26 of the jaws are provided with cushion pads 33 and 34. These cushion pads engage the upper and lower edges of the bumper and prevent scratching or marring the same.

As indicated in Figure 1 of the drawings, the chain 12 is provided with a coil spring 35 connecting two spaced links 36 and 37 of the chain. These links 36 and 37 are spaced apart a distance equal to the length of the spring 35 when a strong pulling force is exerted thereupon. As a result in normal contracted position of the spring 35 the portion of the chain between the links 36 and 37 forms a loop 39.

When a pulling force is exerted upon the chain the force tends to elongate the spring 35, thereby providing a cushioning action which tends to prevent a sudden jerk upon the object being towed. If the pulling is sufficient, the spring 35 will elongate it until the loop 39 in the chain disappears and the chain is substantially straight throughout its length. The spring 35 tends to take up any slack in the chain and thereby greatly improves the towing action. As will also be noted in Figure 1 of the drawings, the chain is anchored to the short lever arm 13 of each of the clamping elements and extends through the loop 23 which is beyond the anchor point. Thus as the chain tends to straighten out the clamping force upon the lever jaws increases. This action is considerably improved by suspending the ring 23 beyond the anchor point of the adjacent end of the chain, as the chain at all times assumes an obtuse angle where it changes direction. At the same time the chain will slip readily through the ring 23 if the pulling force is either tightened or loosened.

The spring 30 connecting the jaws has sufficient tension to hold the jaws from disengagement with the bumper when the chain is slack. At the same time the jaws may be easily disengaged from the bumper by spreading the jaws apart with the hands when it is desired to disengage the clamp.

I have described the member 12 particularly as a chain, as a chain is somewhat easier to use in the present combination than most types of flexible connections. However, it is obvious that a rope, cable, or other flexible connection could be substituted for the chain without changing the spirit of the invention.

In accordance with the patent statutes, I have described the principles of construction and operation of my vehicle towing device, and while I have endeavored to set forth the best embodiment thereof, I desire to have it understood that obvious changes may be made within the scope of the following claims without departing from the spirit of my invention.

I claim:

1. A vehicle towing device including a pair of clamping members and a flexible connection therebetween, the clamping members including a pair of levers pivotally connected intermediate their ends, the levers having opposed jaws, the flexible member being connected to one of the pivotal members of each clamping device and being slidably connected to the other clamping member of each device so that a pull upon the flexible member tends to urge the jaws of the clamping member together, the point of connection between said flexible member and said one lever being nearer the pivot point than the point of connection between said flexible member and the other lever.

2. The structure described in claim 1 and including resilient means for normally urging said jaws together.

3. A towing device for vehicles including a flexible connector and a pair of clamping members, one of which is secured to each end thereof, each clamping member including a pair of levers pivotally connected intermediate their ends, the levers having clamping jaws at one end thereof, one of said levers of each device having the flexible member anchored thereto at a point spaced a predetermined distance from the pivot point, said flexible member being slidably engageable with the other of said members at a point spaced a greater distance from the pivot point, the point of anchoring and the point of slidable connection being on the other ends of said levers.

4. A vehicle towing device including a flexible connector and a pair of clamping members at each end thereof, each said clamping member including a pair of crossed pivoted levers pivotally connected together, said levers having opposed jaws at one end and flexible member connections at their other ends, means anchoring said flexible connection to one of said levers, and means slidably connecting said flexible member to the other of said levers, said means connecting said flexible member to said levers acting to kink said flexible member at an obtuse angle.

5. The structure described in claim 4 in which the means for slidably connecting the flexible member to the other lever comprises a loop pivotally attached to said other lever and through which said flexible member may extend.

6. The structure described in claim 4 in which said other lever extends substantially beyond the first lever at the end thereof opposite the jaws.

7. The structure described in claim 4 and including a spring bridging a portion of said flexible connector.

8. The structure described in claim 4 and including resilient means connecting said jaws and normally urging them together.

9. A clamping member for use in conjunction with a tow chain including a pair of crossed levers pivotally connected together, said levers having opposed jaws at one end thereof, the other end of one of said levers extending substantially beyond the other end of the other lever, means anchoring the tow chain to said other end of said other lever, and a loop pivotally secured to the other end of said one lever through which said tow chain may extend.

10. The structure described in claim 9 and including a hook shaped notch in each of said levers and means for holding said tow chain and said loop anchored in said notches.

RUDOLPH C. JOHNSON.

References Cited in the file of this patent

UNITED STATES PATENTS

| Number | Name | Date |
| --- | --- | --- |
| 255,552 | Webster | Mar. 28, 1882 |
| 1,325,422 | Stuart | Dec. 16, 1919 |
| 2,494,526 | Tungett et al. | Jan. 10, 1950 |